(12) United States Patent
Arcidiacone

(10) Patent No.: US 8,356,863 B2
(45) Date of Patent: Jan. 22, 2013

(54) HEADREST SUPPORT

(75) Inventor: Franco Arcidiacone, Sundern (DE)

(73) Assignee: Thiel & Hoche GmbH & Co. KG, Erkrath (DE)

( * ) Notice: Subject to any disclaimer, the term of this patent is extended or adjusted under 35 U.S.C. 154(b) by 148 days.

(21) Appl. No.: 12/853,041

(22) Filed: Aug. 9, 2010

(65) Prior Publication Data

US 2011/0031795 A1    Feb. 10, 2011

(30) Foreign Application Priority Data

Aug. 7, 2009  (DE) .......................... 10 2009 036 523
Nov. 23, 2009 (DE) .......................... 10 2009 047 020

(51) Int. Cl.
*B60R 21/055* (2006.01)
(52) U.S. Cl. ......................................... 297/391; 297/410
(58) Field of Classification Search .................. 297/391, 297/410
See application file for complete search history.

(56) References Cited

U.S. PATENT DOCUMENTS

| | | | | |
|---|---|---|---|---|
| 5,642,918 A | * | 7/1997 | Sakamoto et al. ........ | 297/391 X |
| 5,816,658 A | * | 10/1998 | Wallis ........................ | 297/391 X |
| 6,631,956 B2 | * | 10/2003 | Mauro et al. ............... | 297/391 X |
| 6,983,995 B1 | * | 1/2006 | Veine et al. .................. | 297/391 |
| 7,621,597 B2 | * | 11/2009 | Oda ............................. | 297/391 |
| 7,845,731 B2 | * | 12/2010 | Sutter et al. ................. | 297/391 |
| 2002/0060489 A1 | * | 5/2002 | Richard ....................... | 297/391 |
| 2003/0020314 A1 | | 1/2003 | Mauro et al. | |
| 2003/0111889 A1 | * | 6/2003 | Meshke et al. .............. | 297/391 |
| 2008/0083855 A1 | * | 4/2008 | Oda ............................. | 248/118 |
| 2008/0238173 A1 | * | 10/2008 | Sutter et al. ................. | 297/391 |

FOREIGN PATENT DOCUMENTS

| | | |
|---|---|---|
| DE | G 92 02 846 2 U1 | 5/1992 |
| DE | 197 34 712 A1 | 2/1999 |
| DE | 102 34 164 A1 | 3/2003 |
| DE | 10 2007 033 604 B3 | 1/2009 |
| JP | 8 090126 A | 4/1996 |

* cited by examiner

*Primary Examiner* — Rodney B White
(74) *Attorney, Agent, or Firm* — Flaster/Greenberg PC

(57) ABSTRACT

Disclosed is a headrest support composed of a tube having means for receiving a headrest and a recess for joining to a seat. In order to guarantee flexible production, it is provided that a body is inserted into the tube in the area of the recess.

12 Claims, 7 Drawing Sheets

HEADREST SUPPORT

BACKGROUND OF THE INVENTION

1. Field of the Invention

Figure 1:
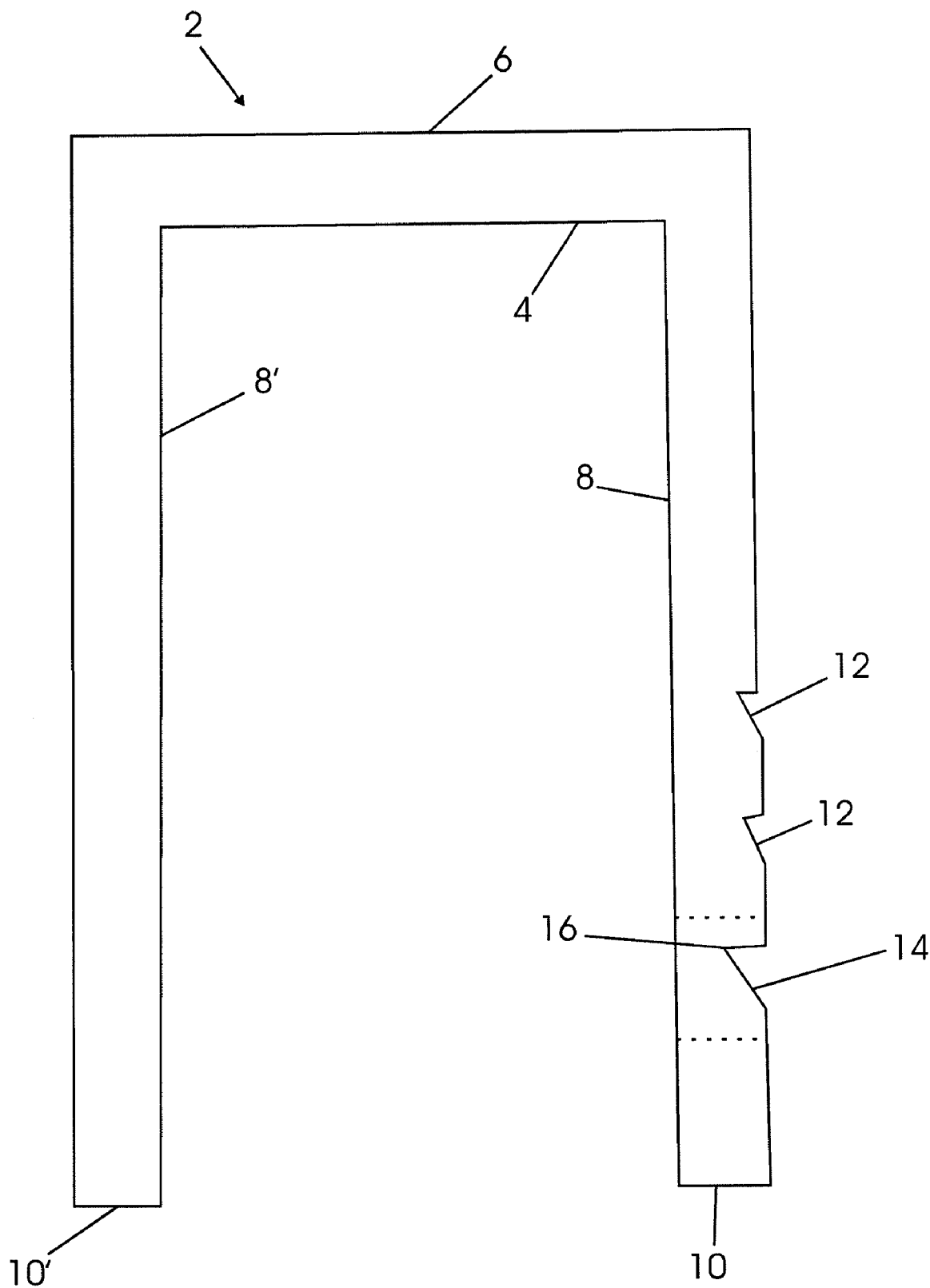

The invention relates to a headrest support having a stay tube for receiving a headrest element, and to a method for producing a headrest support and a headrest having a headrest support.

2. Description of Related Art

Headrest supports are predominantly composed of U-shaped bent tubes, called stay tubes in the following, produced in most cases from band steel by welding, so that these have two limbs having free ends, and disposed between them, a connecting section which serves for receiving the headrest that is normally padded. The headrest can be fastened to the vehicle seat using the limbs of this stay tube that are extending out of the headrest, wherein the limbs are disposed in corresponding receptacles on the vehicle seat.

The stay tubes must conform to prescribed strength properties, so that they withstand the stresses that occur even in the case of a vehicle accident. However, the intensity of the stress varies over the length of the stay tube. Therefore, in the case of a crash, depending on the relative position of the headrest with respect to a vehicle seat, individual sub-areas of the stay tube are subjected to significantly higher stresses than those areas, which for instance, are disposed inside the vehicle seat. A design of the entire stay tube corresponding only to the greatest stress that occurs would guarantee a sufficient stability, however this would lead to a high material use which in turn would lead to high costs.

Furthermore, the stay tubes, in order for them to be usable as a headrest support, are subjected to a series of forming procedures which lead to a structural weakening of the stay tube, and therefore, to a reduction of the stability. In the case of a crash therefore, the formed areas represent particularly critical areas.

Among the forming procedures, in addition to producing bends, is the introduction of indentation marks on at least one limb of the stay tube, so that the headrest can be set in more than one position relative to the vehicle seat. The indentation marks can be formed, for instance, by recesses in the shape of notches, which are introduced into the stay tube and interact with latching means in the vehicle seat. Typically, multiple notches are made at offset distances on a limb, so that the headrest can be positioned at a variable distance to the vehicle seat.

The notches, which can be formed shallow, so that the notch base lies in the wall of the tube, as well as deep, so that the notch base lies deeper than the wall of the tube, as well as the other forming procedures, such as producing bends, lead to a structural weakening of the stay tube.

DE 10 2007 033 604 discloses a head rest support, which with minimized weight, satisfies the strength requirements of headrest supports, which are used particularly in motor vehicles. The tube wall of the stay tube has sections of different material thickness. Sections of greater material thickness are provided where high stresses are expected in the case of a crash, or where notches or recesses are to be installed. The sections of greater material thickness are created during rolling of the tube material for the stay tube. The notches, which are required for positioning the finished headrest on the seat, can be installed in the sections of greater material thickness.

Headrest supports, which have stay tubes having different wall thicknesses, and in which the recesses are installed at sections with greater material thickness, are lighter and stronger than conventional headrest supports. Under stress they deform significantly less than headrest supports that have a constant uniform wall thickness. However, it must be known before manufacturing the stay tube exactly where sections of greater material thickness are to be located. Furthermore, it must be guaranteed that the stay tubes are used exactly (bent, or are connected together) so that sufficient wall thickness is given where the highest stresses occur, or where a notch or other deformations are to be installed. Therefore, the necessary simplicity and flexibility during manufacturing is missing.

DE 197 34 712 discloses a tubular-shaped headrest support, which is reinforced using a wire section.

BRIEF SUMMARY OF THE INVENTION

The object of the invention is to provide a headrest support and a headrest which have high stability with a low weight.

The object of the invention is attained by a headrest support with the features of claim 1, a method with the features of claim 9 and a headrest with the features of claim 10.

The headrest support according to the invention has a stay tube for receiving a headrest element, wherein a reinforcement element is disposed within the stay tube. Here, it is characteristic for the headrest support that the reinforcing element is formed by a hollow body, particularly, a sleeve.

According to the invention, the stay tube of the headrest support, which along with the stay tube can also have further components, but which can also be composed only of the stay tube, has in sections, at least one reinforcing element. Here, the reinforcing element is disposed within the stay tube in an area, for which higher stability is required in comparison to the remaining stay tube.

The invention has the advantage that a structural reinforcing of particularly stressed areas can occur independently from the production of the tubes provided for the stay tubes. This makes it possible to revert back to using standard tubes for the stay tubes for producing the headrest support, which results in a significant cost advantage. The use of one or more reinforcing elements permits the selective reinforcement of individual areas, wherein reinforcing elements can also be selected independently of each other corresponding to the reinforcement to be attained. No widely dimensioned section of the tube wall needs to be reinforced in order to attain different embodiments.

BRIEF DESCRIPTION OF THE SEVERAL VIEWS OF THE DRAWING(S)

Figure 2A:
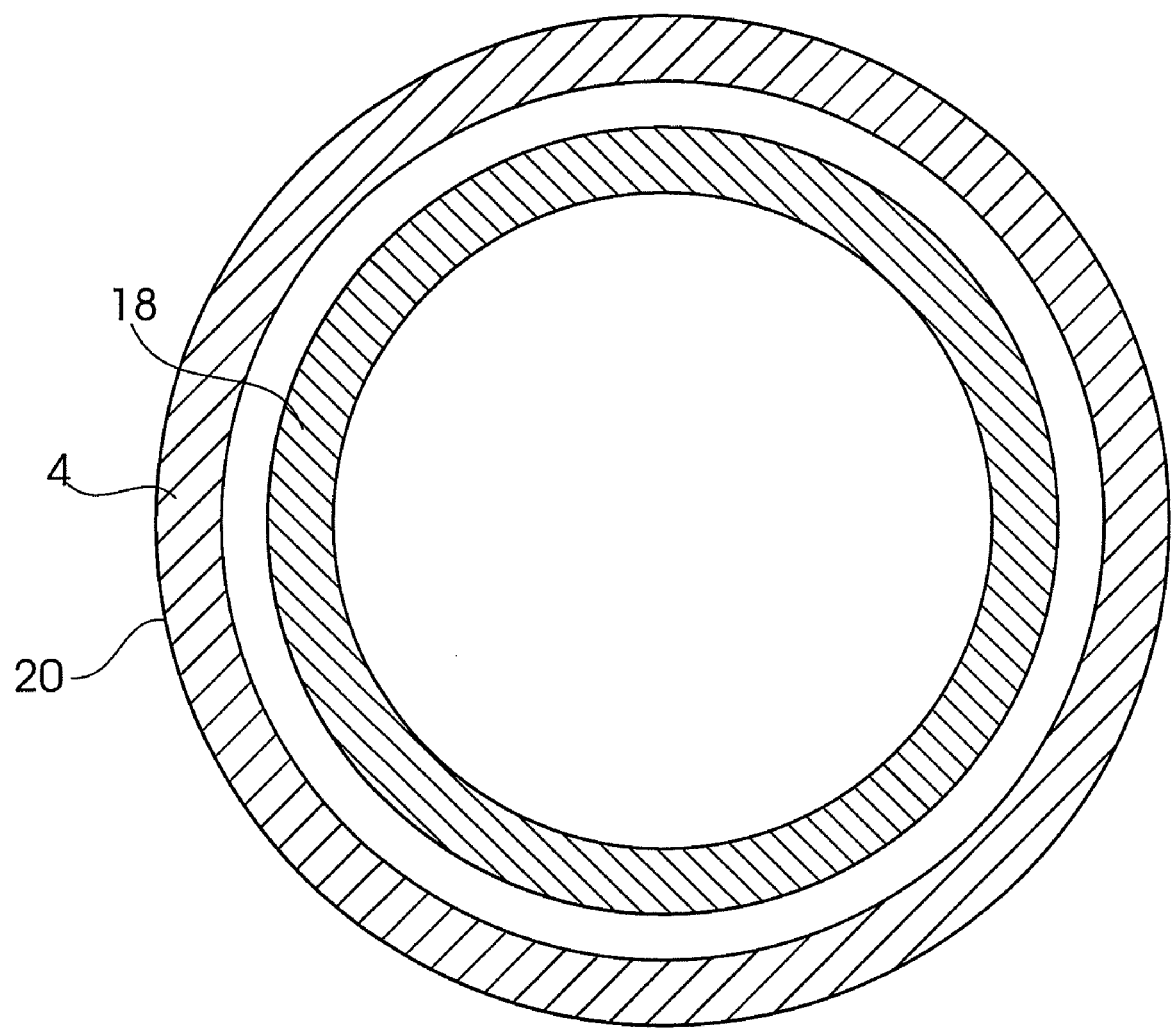
Figure 2B:
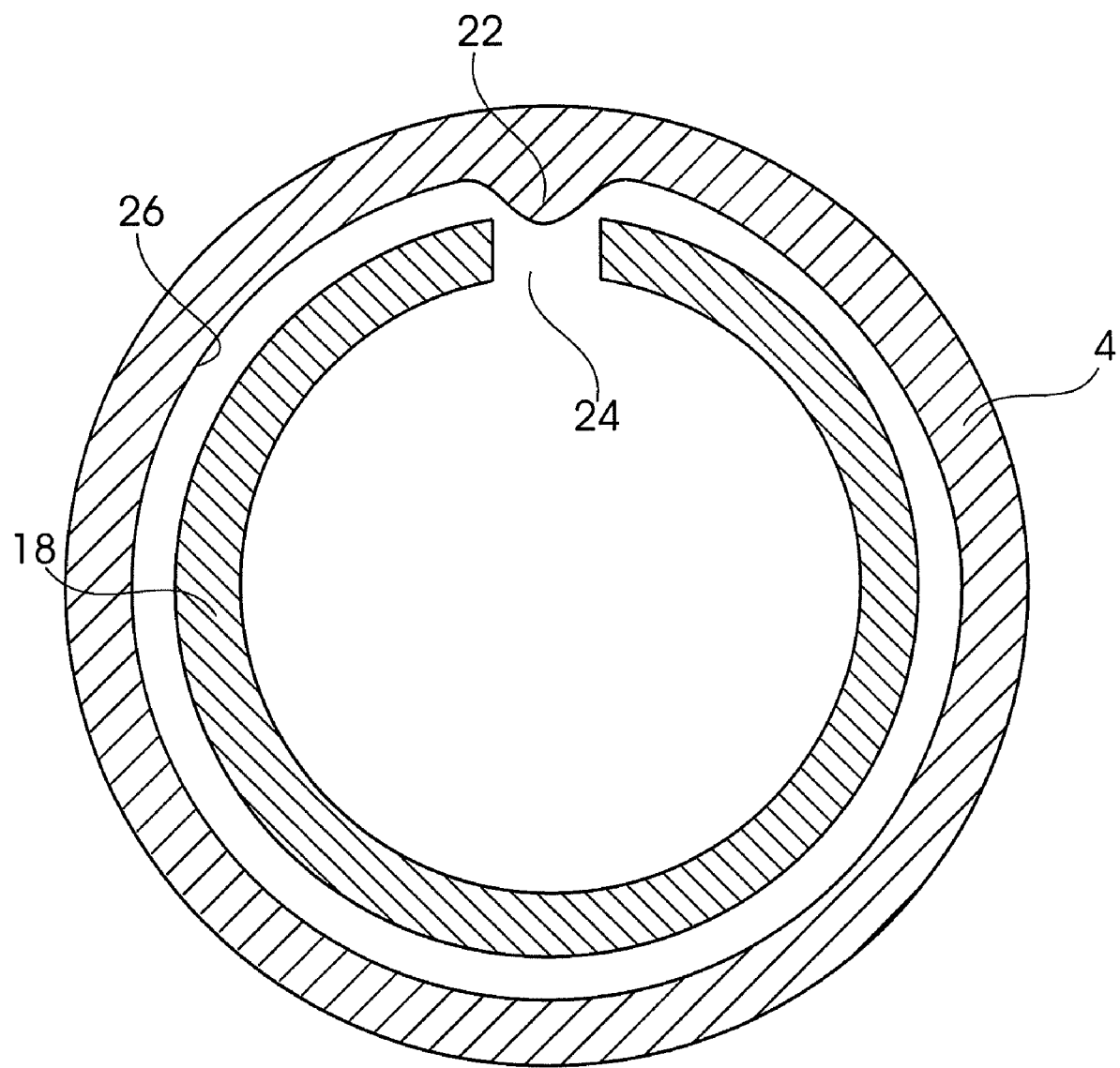
Figure 2C:
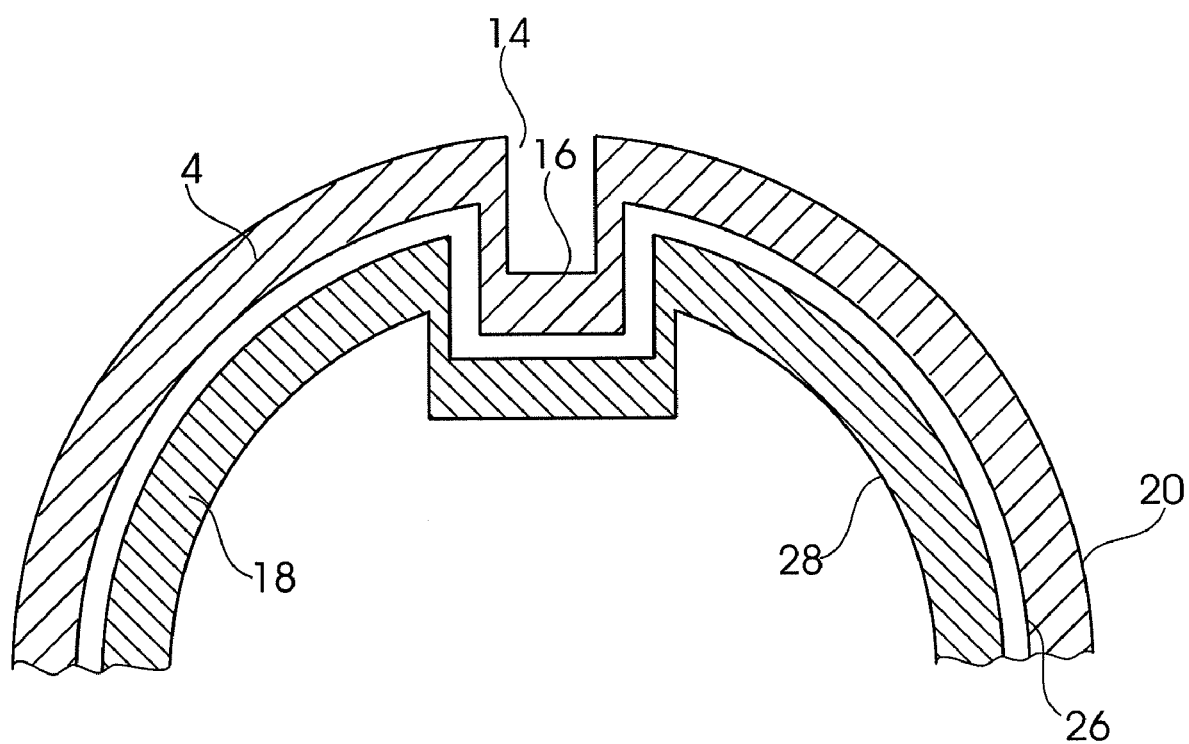
Figure 3:
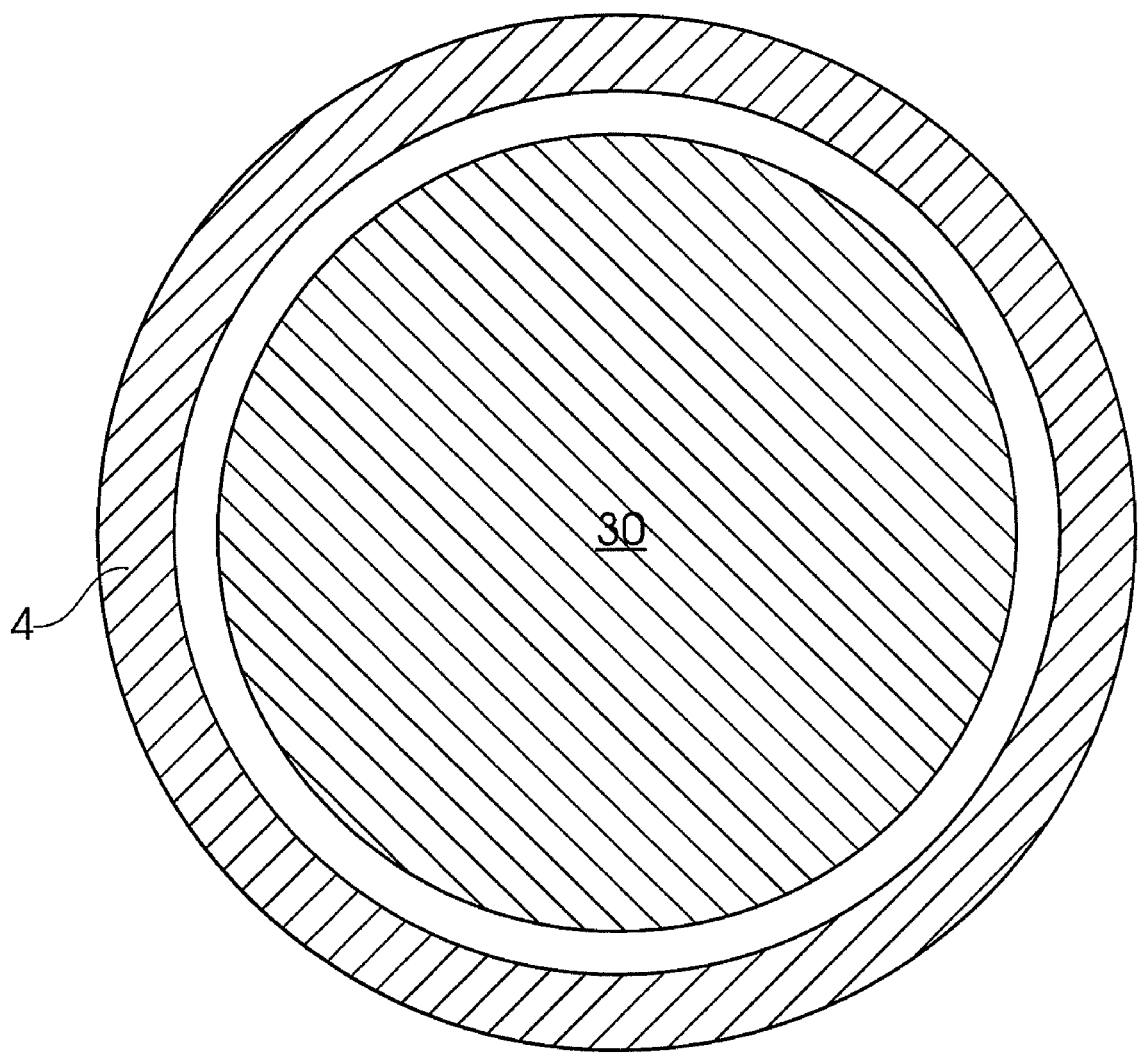
Figure 4A:
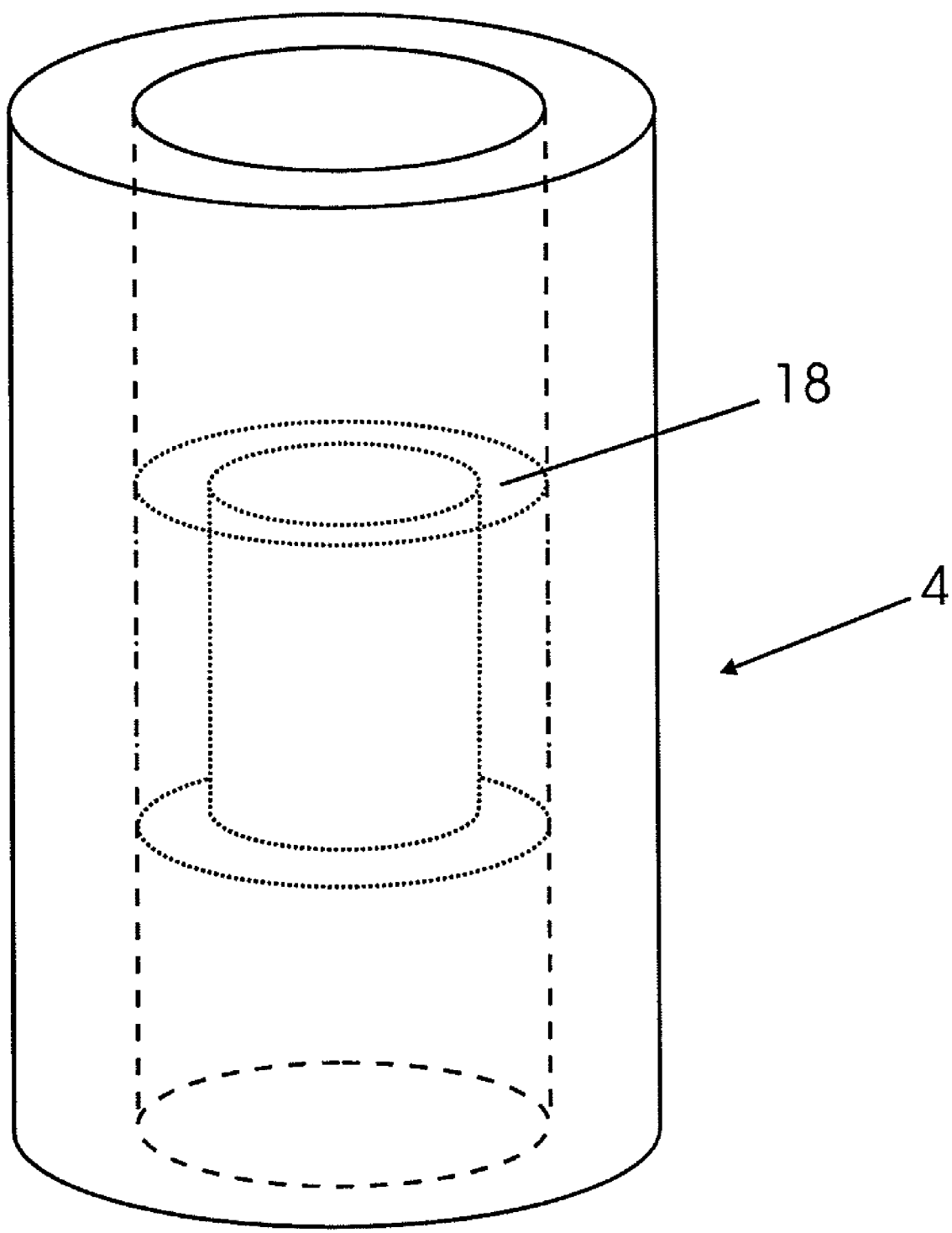
Figure 4B:
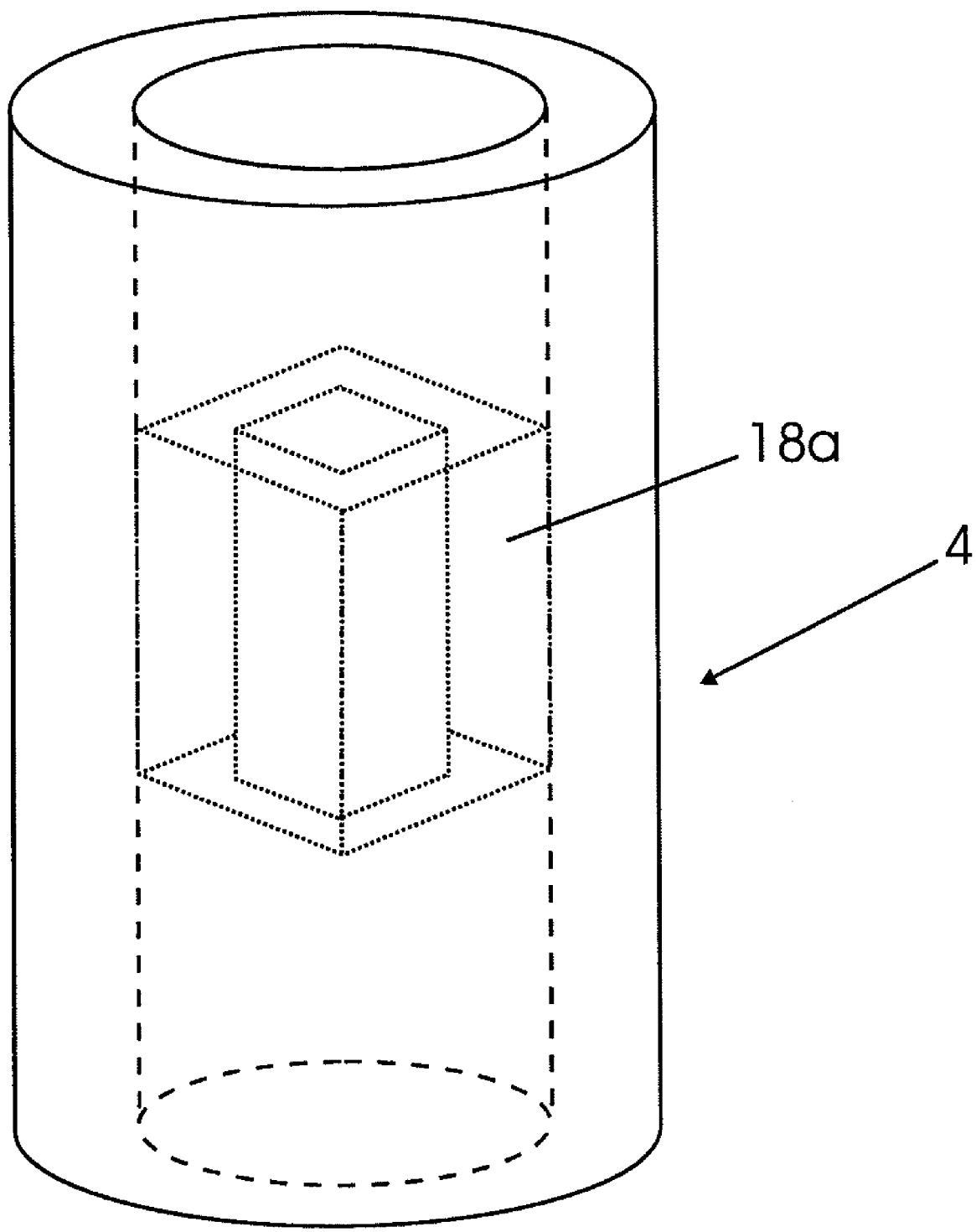

Exemplary embodiments of the invention are described in detail in the following with reference to drawings. They show:

FIG. 1: a schematic representation of a headrest support;

FIG. 2a: a schematic cross-section through a headrest support, implemented as a tube with a sleeve;

FIG. 2b: a schematic cross-section through a headrest support, implemented as a tube with a slit sleeve;

FIG. 2c: a schematic cross-section through a headrest support represented in parts;

FIG. 3: a schematic cross-section through a headrest support, implemented as a stay tube with a sleeve closed on the face side, a plug;

FIG. 4a: a sketch of a section of a stay tube having a circular shaped bushing disposed within, and FIG. 4b: a sketch of a section of a stay tube having a rectangular shaped sleeve disposed within.

DETAILED DESCRIPTION OF THE INVENTION

According to a further development of the invention, the reinforcing element is disposed in an area of a formed section of the stay tube. Accordingly, the reinforcing element is disposed in an area of the stay tube, which during production of the headrest support is subjected to a forming process, for instance producing a bend or the insertion of a recess, such as a notch. Generally, the stay tube is formed from a straight tube element, which is formed corresponding to the design specifications of the headrest support. Essential forming steps are, for example, producing the bends and the insertion of the notches.

Normally, the reinforcing elements are disposed before performing the forming processes, but they can also be disposed after completion of the forming, in so far as this is technically possible. In the case of multiple different formings, it is possible to reinforce these selectively considering the stresses occurring in each case and the degree of weakening resulting from the forming.

According to the invention the reinforcing element is formed by a hollow body, particularly a sleeve. This design of the invention allows the weight of the headrest support to be reduced. Using the design of the wall thickness of the hollow body, particularly the sleeve, the necessary reinforcement can be adjusted very precisely, so that the weight is increased only to the required degree. Moreover, the hollow body, particularly the sleeve allows particularly cost effective production, for instance, by cutting individual elements from a tube.

The type of connection of the reinforcing element to the stay tube can be selected essentially freely, wherein the reinforcing element can, for example, be bonded or welded to the stay tube. According to a further development of the invention, however, the reinforcing element is connected force locking and/or form locking to the stay tube. This connection can be implemented in a particularly simple manner. Thus, the reinforcing element can be fit into the stay tube, which along with a high positioning reliability, has the additional advantage that no additional, possibly, weakening forming of the stay tube is required for disposing the reinforcing element.

The shape of the reinforcing element can be selected freely considering the reinforcement to be attained, and from the viewpoint of the weight. Therefore, the reinforcing element can have, for example, a polygonal, particularly, square, polygonal or elliptical shape, which is adapted to the occurring stresses, independently from the cross-section of the stay tube.

According to a further design of the invention, however, the reinforcing element has a shape adapted to the shape of the formed section, particularly, a cross-section adapted to the cross-section of the formed area. According to this design of the invention, the contour of the reinforcing element corresponds to the shape of the formed area. Basically the contour can result in that the reinforcing element, as provided by a further design of the invention, is also subjected to the forming process of the stay tube, in that the reinforcing element is disposed before the forming. However, it is also possible to use a reinforcing element that was formed beforehand corresponding to the forming to be attained. This results in the advantage that the reinforcing element during the forming supports the forming operation in that it functions as a die.

The forming of the stay tube can occur in any manner, because the reinforcing element compensates for the weakening resulting from the forming. Particularly advantageously, the formed section is created by cutting machining and/or non-cutting machining of the stay tube. These processing methods are particularly suited for producing recesses, wherein a non-cutting machining, e.g., stamping, is particularly preferred for this, because processing can be performed here without waste. However, if most notably, special notch geometries are to be created, cutting machining methods can readily be used.

The reinforcing element can be used in principle on all formed areas of the stay tube. This includes such areas, for instance, provided with a bore, bracket, thread or similar, for disposing attached parts. However, the reinforcing element is particularly advantageously disposed in flattened areas of the stay tube and/or in areas of bends, notches, or indentations, because these areas in particular are subjected to particularly high stresses in the case of a crash.

The disposition of the reinforcing element according to the invention can, as already represented, occur before, as well as after, the forming of the stay tube. However, as provided according to an advantageous further development, if the forming for producing the formed section extends also to the reinforcing element, a disposition into the interior of the stay tube beforehand is mandatory. This design guarantees a secure disposition of the reinforcement element in the stay tube, because a form locking connection is attained by the combined forming. In this respect, another fastening of the reinforcing element to the stay tube can be eliminated. Furthermore, a good load transfer is also guaranteed.

The reinforcing element can be used in principle at each location of the tube at which formings, e.g., recesses, are provided. The reinforcing elements are used particularly preferably were stress calculations indicate that the material of the tube wall does not guarantee sufficient strength, e.g., after the notching. Generally, this is the case where particularly deep recesses or notches are to be installed. According to a particularly advantageous embodiment of the invention, the recess can deform the wall of the tube so far that it extends into the reinforcing element, or the recess can penetrate the tube wall and extend into the reinforcing element. In the case of producing a notch, the notch base, which is the location of the deepest indentation, lies in the reinforcing element which is inserted in the tube. The latter is the case especially when the recess is created by cutting machining. The recess can however extend into the reinforcing element, if it is created by non-cutting machining, e.g., by stamping.

Usually, the reinforcing element, such as the stay tube, is produced from metal. According to an advantageous further development of the invention, the reinforcing element is, however, formed from a material differing from the material of the stay tube. Differing materials can be other metals, but can also be other materials such as ceramic materials, plastics, fiber reinforced plastics, or other composites. The use of differing materials allows the use of a broad spectrum of differently designed reinforcing elements, whereby a further optimization is possible with respect to cost and weight. Also, for different areas of the stay tube, reinforcing elements varying in shape and material can be used that are designed adapted to the respective stresses.

This design allows, for example, a standard tube to be kept in the warehouse, wherein the reinforcing element composed of different material is inserted into the tube, depending on how the headrest support is to be implemented. The material can be selected according to weight, machinability or strength. In particular, the material of the stay tube can be stronger or thicker than the material of the reinforcing element. Alternatively, the material of the reinforcing element can be stronger or thicker than the material of the stay tube.

For example, a high-strength material can be selected for the stay tube so that then light reinforcing material can be used in the area of the formings, for example, notches, which still provides a small contribution to the strength in the area of the notches. Alternatively, a relatively soft stay tube with low strength can be used which is then reinforced in the area of the notches by a particularly strong, stiffening reinforcing element.

The reinforcing element which is inserted into the stay tube can be minimal. In order to minimize the weight savings, in the case of a recess, the reinforcing element can be dimensioned up to 50% or half the length of the recess. The length here is the extent of the stay tube in the longitudinal axis. A significant improvement of the strength of the headrest support can be attained even with such a minimal reinforcing element. However, it is preferred that the reinforcing element corresponds to at least the length of the recess.

In a simple embodiment, the reinforcing element, for instance the sleeve, can have a closed perimeter. The radius of the reinforcing element is usually dimensioned so that the reinforcing element can be slid into the stay tube. Preferably, however, the reinforcing element has a slit which advantageously extends in its longitudinal direction. In the simplest case, the reinforcing element has a groove, which is marginally larger than the dimension of the weld seam forming the stay tube out of band steel. It is preferable if the slit completely penetrates the wall of the sleeve, or if it has at least the length of the radius of a reinforcing element.

The stay tube of the support element according to the invention typically has a welding seam. The welding seam marginally reduces the diameter of the stay tube, often only by fractions of millimeters. This reduction however is sufficient to prevent the unencumbered movement of shaping tools, e.g., mandrels, which are inserted into the tube, in order to create, e.g., a forming such as a notch. Additionally, the welding seam has proven to be an area of reduced strength. Notches cannot be installed easily in the area of the welding seam.

According to a particularly advantageous embodiment of the invention, the slit of the reinforcing element aligns with the welding seam. This embodiment has several advantages: first, the welding seam can serve as a guide for the reinforcing element. Additionally, the material of the reinforcing element reinforces the stay tube also in the area of the welding seam, so that a forming, for instance a recess, can now be installed without having to consider the position of the welding seam. Finally, the reinforcing element acts as a spacer, because e.g., now during stamping, a mandrel is supported against the sleeve, and is matched to its inner diameter. The sleeve does not have a welding seam so that after completion of the stamping procedure, the mandrel can be withdrawn from the stay tube without any trouble.

The invention further relates to a headrest, which has a headrest support according to the claims 1 to 9.

The invention relates also to a method for producing a headrest support for a headrest element having the steps:

disposing a reinforcing element, which is shaped as a hollow body, within a stay tube in the area of a section of the stay tube to be formed, and forming the provided section.

The method according to the invention allows production of the headrest support according to the invention with few steps. Using only two components, the headrest can be manufactured individually and flexibly because the specifications for aligning the reinforcing elements and for creating the formings, for instance recesses can be adapted with a few measures.

The method steps can, in principle, be performed in any order. Generally, the alignment of the reinforcing element in the stay tube, that is, the positioning at the location at which the forming is performed, for instance, at which a bending is to take place or a recess is to be installed, occurs directly in connection with producing the recess. However, this is not mandatory. In particular, if the reinforcing element is positioned force-locking, the installation of the notches does not need to occur at the same time.

As already described, cutting or non-cutting tools can be used for producing the recess. It is particularly preferred to create the notches by stamping. Here, a mandrel is inserted into the stay tube, and interacts with a die so that the notch is produced under pressure without cutting and without loss. However, if special notch geometries are desired, cutting machining methods can also prove to be expedient.

According to an advantageous embodiment of the method according to the invention, a sleeve is placed on the mandrel, and inserted into the stay tube up to a depth at which the reinforcing element is located under the recess to be installed into the tube wall. The stamping tool surrounds the tube wall, exerts pressure on the mandrel, and a notch is stamped. The mandrel is withdrawn from the stay tube.

Alternatively, a sleeve that is closed on the face side, a plug, can be positioned in a stay tube by means of a punch. The notch is then produced using a cutting tool. The punch is withdrawn, at the latest, after producing the notch. If the plug is fixed in the stay tube, for example, because it is disposed form locking, the punch can be removed before forming the recess. This accelerates the processing. Alternatively, the punch can fix the plug during the introduction of the notch, for example, with an adhesive connection, whose adhesive force is weaker than the connection, which is created by the introduction of the notch. The punch can then be withdrawn after the notch is produced. Here, the weaker adhesive connection is more likely to loosen than the connection of the plug to the stay tube.

FIG. 1 shows a headrest support 2 for seats, particularly for vehicle seats. The headrest support 2 consists of a stay tube 4 composed of metal having a diameter of 12 mm and a wall thickness of 1 mm. It is formed approximately U-shaped. Additionally, it is designed to receive a headrest (not shown) at section 6, which connects the two limbs 8, 8' of the U. The headrest is connected to the headrest support 2 using indentations, screws or other known connections. The free ends 10, 10' of the limbs 8, 8' of the headrest support 2 are inserted into the seat back. They join the seat, here a vehicle seat, to the headrest. A limb 8 is provided with recesses or notches 12, 14. These notches 12, 14 are of different shapes. A series of shallow notches or grooves 12 (notch depth less than 1 mm) is concluded at the free end 10 of the limb 8 with a deep notch 14. The deepest location of the notch, the notch base 16, is deeper than the thickness of the tube wall, i.e., greater than 1 mm. This notch is formed V-shaped and serves to lock the support element 2 at the vehicle seat. The locking occurs using a catch installed in the seat back, which is pretensioned by a spring, and which engages in the notches 12 or 14. The offset of the headrest to the vehicle seat can be adjusted manually using the shallow notches 12. The deep notch 14 locks the headrest in place. The catch engages so far into this notch that unlocking is possible only by specifically retracting the catch.

A sleeve 18 is disposed in the stay tube 4 in the area of the deep notch 14. The sleeve 18 is composed of metal. It is 1.5 times as long as the notch 14, whose length is 7 mm. No sleeves 18 or plugs are disposed in the area of the shallow notches 12, because the strength of the tube wall is sufficiently high so that the notches 12 do not weaken the tube wall so severely such that it leads to a deformation in the case of high stress.

FIG. 2a shows a schematic representation of the cross-section of a headrest support 2, according to the invention, as depicted in FIG. 1, above the notch 14. Here, sleeve 18 is disposed inside the stay tube 4. The tube wall 20 has a thickness of 1 mm, and is composed of metal. Other materials can be used, if they have suitable strength properties and machining properties. As sleeves 18 are used predominantly when the notches are formed by non-cutting machining, sleeves 18 that permit deformation by stamping are preferred.

The sleeve 18 is disposed concentrically in the stay tube 4. The representation in the figures is not according to scale; the clearance is selected so that the sleeve 18 can be slid in the stay tube 4. The wall thickness of the sleeve 18 is 0.5 mm. The material of the sleeve 18 has a higher strength than the material of the stay tube 4. The wall thickness of the sleeve 18 can be selected freely according to the requirements of the strength, and the weight. The length of the sleeve 18 can also be selected freely within broad limits. In the areas of the notch, the sleeve 18 must impart at least a strength such that the prescribed loading capacity is given. Often, 0.5 times the length of the notch is sufficient. The sleeve 18 can easily be as long, as it is slid into the stay tube 4. The length of the sleeve 18 is limited by the fact that the cost for the material and the weight of the headrest support 2 are to be kept as low as possible. The sleeve 18 is often longer than the notch in order to stabilize the tube wall in the area of the notch placement. This has a favorable effect on the loading capacity.

FIG. 2b shows a preferred embodiment of the headrest support 2 according to the invention. The stay tube 4 is formed from a rolled metal band that was originally rectangular. The edges abutting each other were then welded, wherein a welding seam 22 is formed in the stay tube 4. The welding seam is approximately 0.5 mm wide and approximately 0.3 mm high. With the stamping methods known to date, the welding seam 22 must always lie in the area of the notch or groove 12, 14. Only then was it possible to remove the mandrel, which with the two-part stamping tool forms the counter piece of the die and which is disposed within the stay tube 4, by rotation out of the stay tube 4, after producing the recess 12, 14.

If a slit sleeve 18 is used, as shown in FIG. 2b, the slit 24 is disposed expediently in the area of the welding seam 22. The sleeve 18 is then guided by the welding seam 22. At the same time, the sleeve 18 acts as a spacer during a stamping procedure. It is now possible to create the recess 12, 14 at any place where it is desired. After stamping, the mandrel no longer abuts on the welding seam 22 during retraction from the stay tube 4. Therefore, it is no longer necessary to align the notch 12, 14 with respect to the welding seam 22. It is clear for this reason that a sleeve 18 can also be used expediently for creating a shallow notch 12.

The slit sleeve 18 shown in FIG. 2b is located in the stay tube 4 under pretension. The sleeve 18 is rolled out from a sheet metal blank or any rectangular piece of metal. The resulting slit is not closed, as with the welding of the stay tube 4. The width of the slit 24—and therefore, the circumference of the sleeve 18—is selected larger than the inner diameter of the stay tube 4. The sleeve 18 is compressed before insertion into the stay tube 4, thus, the width of the slit 24 is reduced, and possibly, the ends of the sleeve 18 can even overlap each other. Then the sleeve 18, in prestressed state, is inserted into the stay tube 4, e.g., using a holding tool or using the mandrel. The sleeve 18 is released at the predetermined location in the stay tube 4, the sleeve expands until it rests against the inner wall 26 of the stay tube 4. The sleeve 18 is now form-lockingly connected to the stay tube 4. It is advantageous here that the notch 12, 14 need not be produced immediately. The stay tube 4 can be easily manipulated, e.g., bent. The sleeve 18 remains fixed in place, the forming of the recess 12, 14 can occur later.

FIG. 2c shows a section of a stay tube 4 with a sleeve 18 inserted within, and a U-shaped notch 14. The notch 14 is to be shaped deep. The notch base 16 lies deeper than the tube wall 20, and even deeper than the thickness of the wall of the sleeve 18. The tube wall 20 and sleeve 18 are strongly deformed and they engage with each other. If the material of the sleeve 18 and the tube wall are sufficiently deformable, a notch can easily be implemented this deeply. Often however, the depth of the notch lies within the range of the wall thickness of the sleeve 18, so that the inner surface 28 of the sleeve 18 is not deformed. The degree of freedom with the implementation of the notch is largely determined by the material used.

FIG. 3 shows a stay tube 4 having a thick-walled, closed face side sleeve disposed within, having a plug 30. The plug is composed of a ceramic material. Because the plug 30 largely fills the cross-section of the stay tube 4, creating a recess 12, 14 by non-cutting means is not possible, because no space is available for compressing the material. Furthermore, the material is not suited for deformation. Here, however, a notch geometry must be created that cannot be produced precisely enough by means of stamping. However, a cutting or material removing machining can create the desired notch geometry here. Cutting, grinding or other methods for removing material can be easily used. In order to guarantee a trouble-free machining, the plug can be adhered in the tube, in that either, initially, adhesive surfaces or spots are applied in the stay tube 4, or in that glue is applied to the plug.

According to an embodiment that deviates from the representation in FIG. 3, a plug can also be provided with a slit, so that the insertion and fixing of the plug is simplified.

The alignment of the body, or the sleeve 18, or the plug 30 in the stay tube 4, and the subsequent cutting or non-cutting machining of the stay tube 4 with a tool for producing the recess 12, 14, were previously described. For producing the support element 2 according to the invention, the forming of the means for receiving the headrest still remains. This occurs before or after inserting the body 18, 30, optionally also, before or after the forming of the recess 12, 14. As a rule it occurs by bending the stay tube 4 into approximately a U-shaped contour. Alternatively, also, tube sections can be welded. Finally, it is often still necessary that the U-shaped support element, particularly the limbs 8, 8' are to be bent out of the plane of the longitudinal axis of the stay tube 4. Then, the padded head part is placed on the headrest support 2, resulting in the headrest.

The FIGS. 4a and 4b each show a section of a stay tube 4 with a reinforcing element disposed therein, before forming stay tube 4. The reinforcing element, as shown in FIG. 4a can be designed as a sleeve 18 with a circular cross-section, wherein the outer cross-section of the sleeve 18 is adapted to the inner cross-section of the stay tube 4. However, the reinforcing element can also have differing designs. A further design of the reinforcing element is represented in FIG. 4b, in which the reinforcing element is designed as a sleeve 18a with a square cross-section.

The headrest support, according to the invention, is lighter weight than the support elements known from the prior art. At the same time, the manufacturing is simple and flexible, because typically another sleeve 18 or another plug 30 is already sufficient if another support element must be produced. The insertion of a reinforcing element proposed according to the invention at the location where a forming, for instance a recess, is to be installed, is sufficient, despite deeper notches, to guarantee a sufficient strength that prevents a deformation under high stress, e.g., in the case of a collision.

It is expressly noted that the individual features or embodiments of the headrest support according to the invention, which were described here in part independently of each other, can be freely combined with each other for producing a headrest support, both individually as well as repeatedly. Therefore, for example, a headrest support can have both sleeves as well as plugs; multiple reinforcing elements can also be contained in a headrest support.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A headrest support having a stay tube for receiving a headrest element, wherein a reinforcing element is disposed within the stay tube, and the reinforcing element is designed as a hollow body, wherein the reinforcing element has a slit extending in a longitudinal direction of the reinforcing element, which aligns with a welding seam of the stay tube.

2. The headrest support according to claim 1, wherein the reinforcing element is disposed in an area of a formed section of the stay tube.

3. The headrest support according to claim 1, wherein the reinforcing element is connected by force locking to the stay tube.

4. The headrest support according to claim 1, wherein the reinforcing element has a shape adapted to a shape of a formed section of the stay tube.

5. The headrest support according to claim 4, wherein the reinforcing element has a cross-section adapted to a cross-section of the formed area.

6. The headrest support according to claim 1, wherein the reinforcing element is disposed in flattened areas of the stay tube and/or in areas of bends, notches or recesses.

7. The headrest support according to claim 1, wherein forming for producing a formed section of the stay tube extends to the reinforcing element.

8. The headrest support according to claim 1, wherein the reinforcing element is shaped from a material differing from a material of the stay tube.

9. A method for producing a headrest support for a headrest comprising the steps:

disposing a reinforcing element, which is designed as a hollow body, within a stay tube in an area of a section of the stay tube to be formed, wherein a slit extending in a longitudinal direction of the reinforcing element is aligned with a welding seam of the stay tube and forming the section of the stay tube.

10. A headrest having a headrest support according to claim 1.

11. The headrest support according to claim 1, wherein the hollow body is a sleeve.

12. The headrest support according to claim 1, wherein the reinforcing element is connected by form locking to the stay tube.

* * * * *